(12) United States Patent
Muhammad et al.

(10) Patent No.: US 7,546,215 B2
(45) Date of Patent: Jun. 9, 2009

(54) METHOD FOR CALIBRATING A POWERED SEAT

(75) Inventors: Khalid Muhammad, Newbury Park, CA (US); Melvyn Koh, South Pasadena, CA (US); Rocco Joseph Telese, Saugus, CA (US); Ashley Green, Arcadia, CA (US); Irfan M. Khan, NewBury Park, CA (US); Emad W. Ibrahim, Thousand Oaks, CA (US); Ary Geuvdjelian, Tarzana, CA (US)

(73) Assignee: Crane Co., Stamford, CT (US)

( * ) Notice: Subject to any disclaimer, the term of this patent is extended or adjusted under 35 U.S.C. 154(b) by 0 days.

(21) Appl. No.: 11/787,310

(22) Filed: Apr. 14, 2007

(65) Prior Publication Data

US 2008/0255788 A1 Oct. 16, 2008

(51) Int. Cl.
*G01C 25/00* (2006.01)
(52) U.S. Cl. ........................................ 702/94
(58) Field of Classification Search .................... 702/94
See application file for complete search history.

(56) References Cited

U.S. PATENT DOCUMENTS

| | | | | |
|---|---|---|---|---|
| 4,401,928 A | * | 8/1983 | Kamijo et al. ............... 318/466 |
| 4,463,426 A | | 7/1984 | Caddick et al. | |
| 4,467,252 A | * | 8/1984 | Takeda et al. ............... 318/603 |
| 5,203,609 A | * | 4/1993 | Stoeckl ................. 297/344.13 |
| 5,651,587 A | | 7/1997 | Kodaverdian | |
| 5,964,455 A | * | 10/1999 | Catanzarite et al. ......... 267/131 |
| 6,441,576 B1 | * | 8/2002 | Marin-Martinod et al. ........................ 318/568.1 |
| 6,513,799 B2 | * | 2/2003 | St.Clair ....................... 267/131 |
| 6,583,596 B2 | | 6/2003 | Nivet et al. | |
| 6,731,088 B2 | | 5/2004 | Nivet | |
| 6,771,037 B2 | | 8/2004 | Nivet | |
| 6,871,120 B1 | * | 3/2005 | Nivet ......................... 700/302 |
| 2006/0168731 A1 | * | 8/2006 | Menkedick et al. ............. 5/618 |
| 2008/0009989 A1 | * | 1/2008 | Kim et al. ..................... 701/36 |
| 2008/0255734 A1 | * | 10/2008 | Altshuller et al. ............. 701/49 |

FOREIGN PATENT DOCUMENTS

| | | |
|---|---|---|
| FR | 2 801 480 | 6/2001 |
| FR | 2 821 252 | 8/2002 |
| JP | 2005-257668 | 9/2005 |

OTHER PUBLICATIONS

Written Opinion of the International Searching Authority for International Application No. PCT/US2008/059958, filed Apr. 10, 2008, Written Opinion dated Aug. 18, 2008 and mailed Aug. 18, 2008 (3 pgs.).
International Search Report for International Application No. PCT/US2008/059958, filed Apr. 10, 2008, International Search Report dated Aug. 18, 2008 and mailed Aug. 18, 2008 (3 pgs.).

* cited by examiner

*Primary Examiner*—Michael P. Nghiem
*Assistant Examiner*—Cindy H Khuu
(74) *Attorney, Agent, or Firm*—Christie, Parker & Hale, LLP

(57) ABSTRACT

A method of calibrating a powered seat includes storing a first position of at least one seat part in a memory, calculating a second position of the at least one seat part by adding to the first position a difference between a predetermined value of first position and a predetermined value of the second position, and storing the calculated second position in the memory.

20 Claims, 2 Drawing Sheets

METHOD FOR CALIBRATING A POWERED SEAT

BACKGROUND

The present application generally relates to powered seats, and more particularly, to a system and method for calibrating a powered seat.

Modern airplane seats, and in particular, seats in the premium sections of passenger airplane are powered and adjustable between a number of seating positions. Some seats may be adjustable from an upright position to a reclined position, while others can recline to a substantially flat position in order to function as a bed. Additionally, some airplane seats have a head rest and a foot rest that can be adjusted to provide a comfortable position for each passenger. The various adjustable features of the seat are accessible and controllable with a passenger control unit, which may be a keyboard-type of input device with a display. The passenger control unit may also provide the passenger with the ability to adjust the environmental conditions around the seat, such as lighting, temperature and the like. Furthermore, the passenger control unit can also allow the passenger to operate various entertainment devices and features associated with the seat.

A seat must be calibrated after the initial built or at any time an actuator(s) or a controller is replaced during the service of the seat. The purpose of the calibration is record/store positional data in the controller of all actuators installed in the seat at two extreme travel positions, the two extreme travel/reference positions generally are most upright position which is called TTL (taxi take-off and landing) and BED position. In the TTL position all seat components/axis e.g. leg rest, footrest or recliner, are fully stowed and in the BED position all seat components/axis are at fully extended positions. After the calibration, all actuators always travel within two the stored limits, the motion is managed by the seat controller based on the motion program stored in a memory of the controller. Only after calibration, the seat can be used per its designed intent.

In order to calibrate a seat, the first step involves manually moving the seat to a known reference position. This reference position may be the Taxis-Takeoff-Landing position of the seat, which typically is a position where the seat is at its most upright position. In the second step, the actuators of the seat are all manually moved to the BED position, which is the most extended position of the seat so that it can be used for sleeping. In a third step, the actuators are all manually moved to the TTL position and a calibration button on the passenger control unit is depressed. The manual movement of seat in the first to the third steps may be necessary to ensure that the operating range of a potentiometer which senses the motion of the seat is compatible with travel range of the seat. During the first three steps, should the potentiometer reach its end of travel before the travel limit of the seat has been reached, a gear which is coupled to the slip clutch and a shaft of the potentiometer slips. Accordingly, moving the seat in the first three steps ensures that the potentiometer would turn through out the mechanical travel range of the seat and sense the position of the seat as opposed to slipping and not correctly sensing the position. In a fourth step, the actuators are all manually moved to the BED position and the calibration button on the passenger control unit is depressed. In a final step, the seat is electrically moved back to the TTL position. Each of the first four step of the above-described process may take more than two minutes and the final step may take more than one minute. Thus, a typical calibration process for a powered seat may take more than nine minutes.

Based on the above, there is a need for a calibration process that is simpler to perform, faster and requires less operator intervention.

SUMMARY OF THE INVENTION

In accordance with an aspect of the disclosure, a method of calibrating a powered seat includes storing in a memory a first position of at least one seat part or multiple seat parts up to a maximum number of seat parts with which the seat is designed, determining a second position of the at least one seat part or multiple seat parts by adding to the first position a difference between a predetermined value of first position and a predetermined value of the second position for the at least one seat part or each of the multiple seat part, and storing the determined second position in the memory.

In accordance with another aspect of the disclosure, a method of calibrating a powered seat includes receiving a sensor output corresponding to a first position of at least one part of the seat, storing the sensor output in a memory, calculating a sensor output corresponding to a second position of the at least one part of the seat by adding to the stored sensor output of the first position a difference between a predetermined sensor output corresponding to the first position and a predetermined sensor output corresponding to the second position, storing the calculated sensor output corresponding to the second position in the memory.

In accordance with another aspect of the disclosure, a method of calibrating a powered seat includes storing in a memory a first position of an actuator or multiple actuators up, to a maximum number of actuators with which the seat is designed, determining a second position of the actuator or the multiple actuators by adding to the first position a difference between a predetermined value of the first position and a predetermined value of the second position for the one actuator or each of the multiple actuators, and storing the determined second position in the memory.

DETAILED DESCRIPTION

Figure 1:
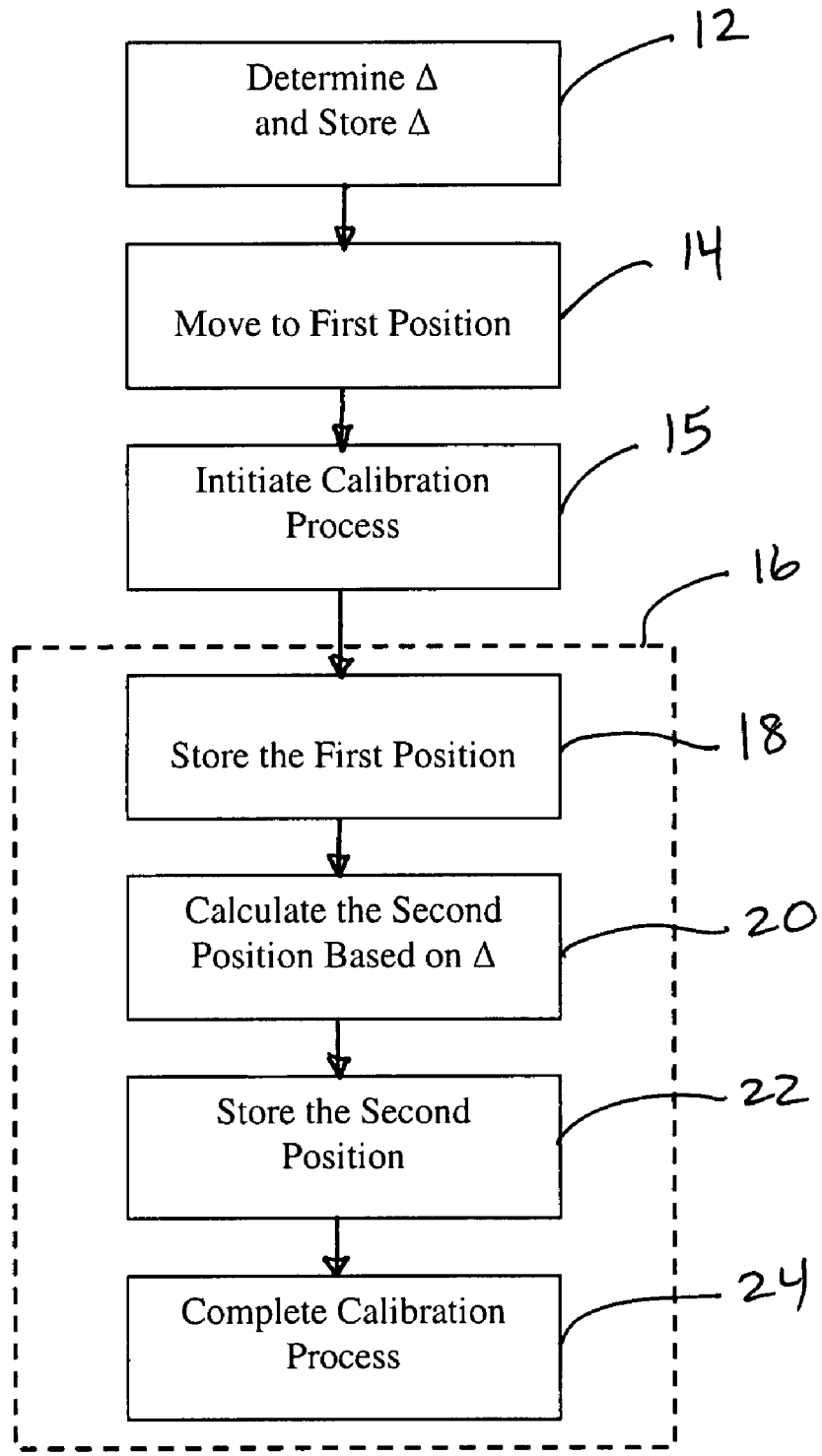
FIG. 1 shows a flow chart of a method for calibrating a vehicle seat according to aspects of the disclosure.

Referring to FIG. 1, a method 10 for calibrating a powered seat 100 (shown in FIG. 2) according to the disclosure is shown. Prior to beginning a calibration process 16, a Δ value for each seat part is determined at step 12 and feed into a memory of a seat controller during the programming phase of the seat, that information becomes part of the production software loaded into all production controllers. Additionally, if the seat or any seat part is not in a first position, it is manually moved to the first position at step 14. The calibration process begins at step 15, where an operator initiates the calibration process 16. Upon initiating the calibration process at step 15, the controller can automatically without operator intervention perform steps 18-24 of the calibration process 16 through software. Accordingly, upon initiating the calibration process at step 15, the position of the seat or a seat part, which is the first position, is stored. At step 20, the second position for the seat or each seat part is calculated by adding the predetermined Δ to the stored first position. At step 22, the calculated second position is stored. At step 24, the calibration process is completed. Accordingly, the first position of the seat or each seat part and the second position of the seat or each seat part are determined to complete the calibration process 16 of the seat. Therefore, the calibration method 10 allows the operator to calibrate the seat by only performing one action, which is initiating the calibration process at step 15, or only two actions if the seat is required to be moved to the first position prior to calibration.

Figure 2:
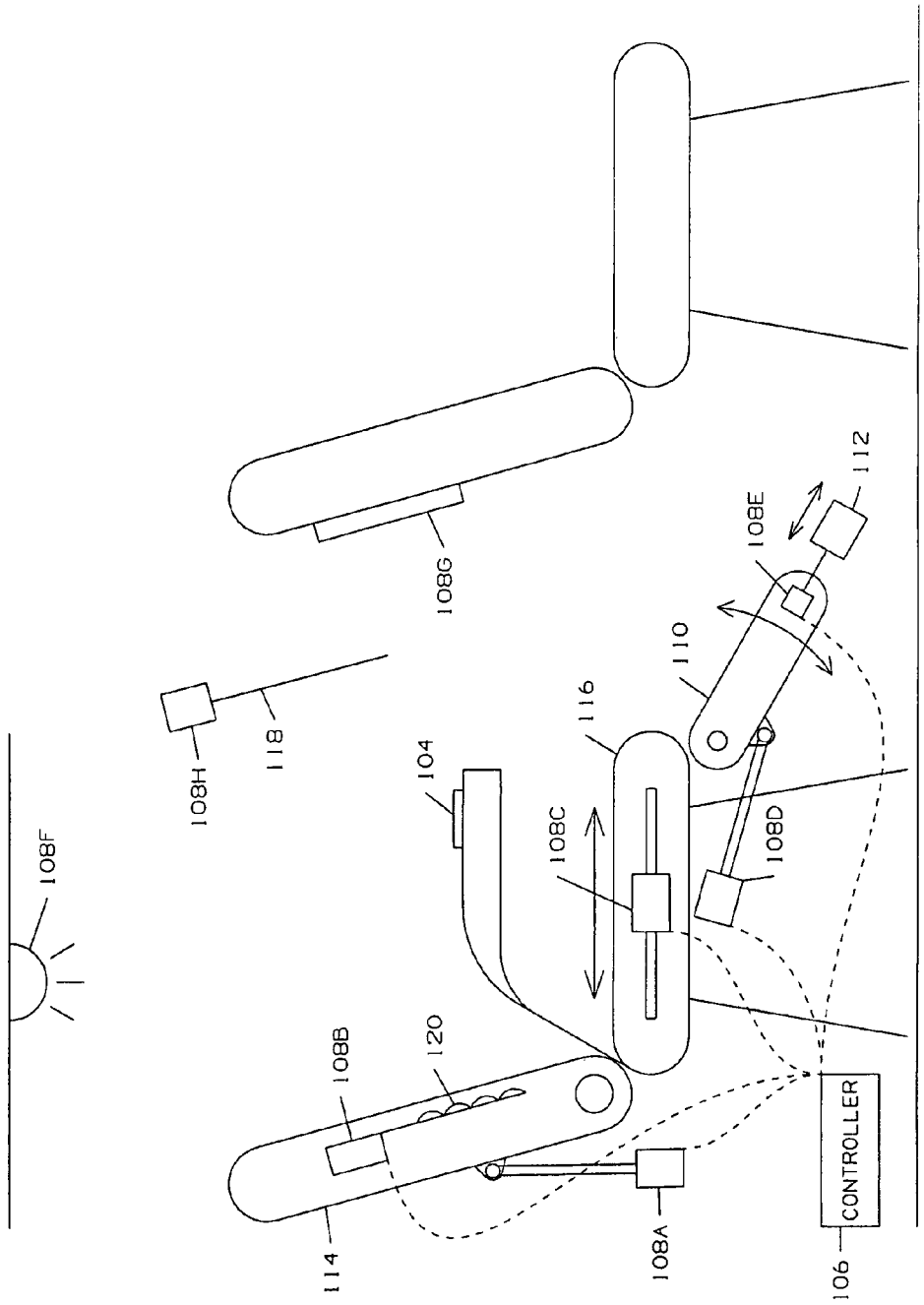
FIG. 2 shows a seat for use in an aircraft.

FIG. 2 illustrates an example a powered vehicle seat 100. The seat 100 is the type that is typically used on passenger airplane. However the seat 100 may be any type of powered seat with moveable seat parts such that the seat can be placed in a variety of seating positions. The seat 100 includes a passenger control unit (PCU) 104 (e.g. a keyboard, display, etc.), a controller 106 and several actuators or other devices 108A-H. A passenger (not shown) sitting in the seat uses the keypad to adjust the seat position and associated devices. The keypad communicates with the controller 106 which, in turn, controls the actuators. The controller 106 includes or is coupled to a memory module for storing information related to operation of the seat. The seat controller 106 also drives the actuators which control the motion of various seat parts. Each actuator can move a seat part through a range of motion. For example, an actuator 108D moves leg rest 110 that moves from a substantially vertical retracted position to a substantially horizontal, extended position. An actuator 108E moves a the foot rest 112, that moves from a substantially extended to a substantially retracted position. The foot rest 112 may extend from the leg rest 110. An actuator 108A moves the reclining back rest 114 (also referred to herein as the recliner) that moves from a substantially vertical position to a substantially horizontal position. An actuator 108C moves the seat pan 116. An actuator 108H moves the privacy screen 118. A lumbar controller 108B drives/controls the lumbar bladder 120. In addition, each actuator may include one or more position determining components such as a transducer or sensor (not shown). Several seat parts can be coupled to a single actuator such that powering the actuator simultaneously moves the seat parts. For example, forward and rearward movement of the seat and the extension of a leg rest can be coupled.

The first position and the second position are reference positions of the seat that can be used to define a range of motion for the seat, seat parts or any seat axis. In the disclosure, the calibration process 16 begins with the seat being in the first position and the second position being determined by the calibration process 16. With reference to powered seats used in aircraft, such as the seat 100 of FIG. 2, the reference positions can be a TTL position (Takeoff-Taxi-Landing) position and a BED position, which is an extended position of the seat. In the following, to describe aspects of the calibration method 10 of the disclosure, the first position is referred to as the TTL position and the second position is referred to as the BED position. However, the first position may be the BED position and the second position may be the TTL position.

Each actuator 108 may be connected to a specific seat part in order to move the specific seat part along an axis of the seat 100. Some actuators 108 may be connected to multiple seat parts in order to simultaneously move the multiple seat parts along an axis of the seat 100. Accordingly, each actuator 108 can control motion of the seat, a seat part, multiple seat parts, or a specific axis of motion of the seat 100. Each seat part can be moved relative to a seat axis within a range of translational and/or rotational motion defined by the mechanical design of the seat. For example, rotation of the leg rest 110 is mechanically limited within a range of motion defined by a fully stowed position of the leg rest 110 and a fully extended position of the leg rest 110.

In order to utilize the calibration method 10 of the present disclosure, all actuators 108 can be designed and/or prepared prior to their installation in the seat 100 in such a way that after their installation when the seat 100 is manually moved to the first position, i.e., the reference position, the position sensors of the actuators have a working range available to reach the second position, i.e., the other reference position. Thus, if the reference position for use with the calibration process is the TTL position, which may generally be the case, the position sensors of the actuators 108 have a working range available to reach to the BED position.

Each actuator 108 can include a position sensor (not shown), such as a potentiometer, which can provide information regarding the position (i.e., translation or rotation) of each actuator 108 or seat part. Thus, the range of motion of each seat part or seat axis can be defined by the output of the corresponding position sensor. Prior to calibration of the seat, the output of each position sensor corresponding to the range of motion for each seat part or seat axis is determined. Thus for each seat part or seat axis, outputs of the corresponding, position sensor for the TTL position and the BED position can be determined. For example, reading the position sensor of the actuator associated with the leg rest 110 at the TTL position of the leg rest 110, i.e., the stowed position, can result in a sensor output value associated with the TTL position. Similarly, reading the position sensor of the actuator associated with the leg rest 110 at the BED position of the leg rest 110, i.e., the extended position, can result in a sensor output value associated with the BED position. Thus, prior to calibration of the seat, the output of each position sensor for the TTL position and the BED position is determined. The difference between the output of each position sensor for the TTL position and the BED position is also determined. This difference is referred to herein as $\Delta$. Therefore, the $\Delta$ for each position sensor is predetermined. The predetermined $\Delta$ for each sensor, i.e., actuator, is then stored in the memory of the controller 106 for use in the calibration process 16 as described below.

Referring to FIG. 1, prior to the calibration process 16, the seat 100 or each seat part is moved to the TTL position, i.e., the first position at step 14. However, as described below the seat 100 or each seat part may be already in the TTL position. The TTL position can be defined by the seat 100 including the backrest 114 being at their most upright positions with the leg rest 110 being stowed away so that it is not in use. The BED position can be defined by the seat including the backrest 114 being at their most extended position with the leg rest 110 extended to form an extension of the seat. Accordingly, the TTL position and the BED position can define the range of motion of the seat during use by a passenger. Seats can be placed in the TTL position so as to occupy less space during storage, transport, and installation in an aircraft. For example, seats can be placed in the TTL position for shipping to aircraft manufacturers for installation in aircraft. Accordingly, the seat may be already in the TTL position when installed in the aircraft and prior to the calibration process 16. Therefore, moving the seat to the TTL position, i.e. the first position, at step 14 may not be necessary prior to performing the calibration process 16.

The calibration process can begin at step 18 by the controller 106 storing in the memory the output of the position sensor associated with each actuator 108. Thus, the stored output of each position sensor corresponds to the TTL position of each seat part or seat axis. The calibration process 16 can be initiated by an operator pressing a button or moving a switch that sends a calibration command to a controller 106 of the seat to begin the calibration process.

At step 20, the controller 106 calculates the BED position for each seat part or seat axis. As described above, the Δ for each seat part or seat axis is known prior to the calibration process. The controller 106 calculates the BED position for each seat part or seat axis by adding the corresponding Δ to each of the TTL position sensor outputs stored in the memory at step 18. At step 22, the controller 106 stores the calculated BED position in the memory. Thus, after step 22, both the TTL position and the BED position for each seat part or seat axis are stored in the memory of the controller 106. When a passenger operates the seat 100, the stored TTL positions and BED positions for each seat part or seat axis define the range of motion by which the passenger can move the seat.

When both the TTL position and the BED position are recorded by the controller 106, the seat is calibrated and can move between the two positions. Accordingly, a passenger can move the seat to the TTL position and the BED position by using the passenger control unit. Because the range of motion of the seat is defined by the TTL position and the BED position, any intermediate position can also be defined with reference to the TTL position and the BED position and stored in the memory of the controller 106. For example, a rest position of the seat that may be between the TTL position and the BED position can be defined by a passenger. Such a position can be stored in the memory of the controller 106 as a position which is offset from anyone of the TTL and BED positions by a certain angular or linear distance. The seat operating system can then move the seat to the rest position from any other position of the seat if a passenger requests a rest position.

In order to prevent a passenger from reaching the physical limits of the seat when moving the seat to the TTL position and the BED position, the output sensors can be designed such that the output corresponding to the TTL position and the BED position do not correspond to the mechanical limits of the actuator, rather correspond to limits that are within the mechanical limits of the actuator. Accordingly, although the seat is farther moveable than the TTL and BED positions, a passenger cannot move the seat beyond the TTL position and the BED position after the seat is calibrated.

The calibration method 10 can be implemented by software that is stored in the memory and executed by the controller 106 Accordingly, the control software which controls the motion of the seat 100 can have the capability to perform the calibration method 10 disclosed herein. However, if existing seats are retrofitted in order to use the calibration method 10, either the existing control software of these seats can be modified in order to perform the calibration method 10, or the existing software can be replaced by new control software that also includes the capability to perform the calibration method 10.

Referring to FIG. 1, step 12 can be performed by the seat actuation system manufacturer. Step 12 can be generally performed during a motion software programming phase of the seat. Thus, Δ can be determined and stored in the controller software. Additionally, step 14 can be performed by the manufacturer of the seat in preparation for shipment to an installer or operator. Accordingly, the manufacturer may perform step 14 by placing the seat in the first position, which may be generally the TTL position. Once the seat is received by the installer or operator, the seat will be ready to use and no further action is required by the operator/airline or installer. However if during service the operator is required to replace any of the actuators or the controller, the operator has to perform step 14 and 15 to recalibrate the seat.

The reference position of the seat that serves as the first position in the calibration process may have to be determined prior to designing and implementing the hardware and software for the seat. Accordingly, the first position may be predetermined as the TTL position and the seat hardware and control software including the calibration software may be used only with the TTL position as the reference position for the calibration process. However, the first position may be generally the TTL position so as to occupy less space during storage, transport, handling and installation in an aircraft as described above.

As described above, the calibration method 10 of the disclosure allows an operator to calibrate a seat by only performing two steps, which are moving the seat to a reference position, such as the TTL position, and activating the calibration process. If the seat is already at the TTL position when installed in an aircraft, the method 10 of the disclosure allows the operator to calibrate the seat by only performing a single step, which is by activating the calibration process.

In summary, the disclosure generally relates to an improved calibration method and system for a powered seat. While certain exemplary embodiments have been described above in detail and shown in the accompanying drawings, it is to be understood that such embodiments are merely illustrative of and not restrictive of the broad disclosure. In particular, it should be recognized that the teachings of the disclosure apply to a wide variety of systems and processes. It will thus be recognized that various modifications may be made to the illustrated and other embodiments of the disclosure described above, without departing from the broad inventive scope thereof. In view of the above it will be understood that the disclosure is not limited to the particular embodiments or arrangements disclosed, but is rather intended to cover any changes, adaptations or modifications which are within the scope and spirit of the disclosure as taught herein.

What is claimed is:

1. A method of calibrating a powered seat, the method comprising:
   storing a first position of at least one seat part in a memory;
   calculating a second position of the at least one seat part by adding to the first position a difference between a predetermined value of the first position and a predetermined value of the second position; and
   storing the calculated second position in the memory;
   wherein the difference between the predetermined value of the first position and the predetermined value of the second position is determined before storing the first position of the at least one seat part in memory.

2. The method of claim 1, further comprising manually moving the at least one seat part to the first position before storing the first position in the memory.

3. The method of claim 1, wherein the first position comprises a Taxi-Takeoff-Landing position and the second position comprises a BED position.

4. The method of claim 1, wherein the first position comprises a BED position and the second position comprises a Taxi-Takeoff-Landing position.

5. The method of claim 1, wherein first position and the second position define a physical range of motion of the at least one seat part.

6. The method of claim 1, wherein the first position and the second position are within a physical range of motion of the at least one seat part.

7. A method of calibrating a powered seat, the method comprising:
   receiving a sensor output corresponding to a first position of at least one part of the seat;
   storing the sensor output in a memory;

calculating a sensor output corresponding to a second position of the at least one part of the seat without moving the part of the seat to the second position by adding to the stored sensor output of the first position a difference between a predetermined sensor output corresponding to the first position and a predetermined sensor output corresponding to the second position; and storing the calculated sensor output corresponding to the second position in the memory.

8. The method of claim 7, further comprising manually moving the at least one part of the seat to the first position prior to receiving a sensor output corresponding to the first position.

9. The method of claim 7, wherein the first position comprises a Taxi-Takeoff-Landing position and the second position comprises a BED position.

10. The method of claim 7, wherein the first position comprises a BED position and the second position comprises a Taxi-Takeoff-Landing position.

11. The method of claim 7, wherein the first position and the second position define a physical range of motion of the at least one part of the seat.

12. The method of claim 7, wherein the first position and the second position are within a physical range of motion of the at least one part of the seat.

13. The method of claim 7, wherein the predetermined sensor output corresponding to the first position comprises a sensor output of an actuator coupled to the at least one seat part when the actuator is in a position corresponding to the first position of the at least one seat part.

14. The method of claim 7, wherein the predetermined sensor output corresponding to the second position comprises a sensor output of an actuator coupled to the at least one seat part when the actuator is in a position corresponding to the second position of the at least one seat part.

15. A method of calibrating a powered seat, the method comprising:

storing a first position of an actuator in a memory;

determining a second position of the actuator without moving the actuator to the second position by adding to the first position a difference between a predetermined value of the first position and a predetermined value of the second position; and storing the determined second position in the memory.

16. The method of claim 15, further comprising manually moving the at least one seat part to the first position before storing the first position in the memory.

17. The method of claim 15, wherein the first position comprises a Taxi-Takeoff-Landing position and the second position comprises a BED position.

18. The method of claim 15, wherein the first position comprises a BED position and the second position comprises a Taxi-Takeoff-Landing position.

19. The method of claim 15, wherein first position and the second position define a physical range of motion of the at least one seat part.

20. The method of claim 15, wherein the first position and the second position are within a physical range of motion of the at least one seat part.

* * * * *